(12) United States Patent
Cooper

(10) Patent No.: US 8,745,689 B2
(45) Date of Patent: Jun. 3, 2014

(54) CHANNEL SURFING COMPRESSED TELEVISION SIGN METHOD AND TELEVISION RECEIVER

(76) Inventor: J. Carl Cooper, Monte Sereno, CA (US)

( * ) Notice: Subject to any disclaimer, the term of this patent is extended or adjusted under 35 U.S.C. 154(b) by 1243 days.

(21) Appl. No.: 10/462,867

(22) Filed: Jun. 16, 2003

(65) Prior Publication Data

US 2004/0003399 A1 Jan. 1, 2004

Related U.S. Application Data

(60) Provisional application No. 60/393,322, filed on Jul. 1, 2002, provisional application No. 60/402,475, filed on Aug. 8, 2002, provisional application No. 60/429,723, filed on Nov. 27, 2002.

(51) Int. Cl.
*H04N 7/16* (2011.01)

(52) U.S. Cl.
USPC ........... 725/151; 725/32; 725/38; 348/725

(58) Field of Classification Search
None
See application file for complete search history.

(56) References Cited

U.S. PATENT DOCUMENTS

| | | | | |
|---|---|---|---|---|
| 5,493,638 A | * | 2/1996 | Hooper et al. | 345/636 |
| 5,512,954 A | * | 4/1996 | Shintani | 348/468 |
| 5,583,560 A | * | 12/1996 | Florin et al. | 725/40 |
| 5,856,975 A | * | 1/1999 | Rostoker et al. | 370/395.64 |
| 5,903,816 A | * | 5/1999 | Broadwin et al. | 725/110 |
| 6,072,537 A | * | 6/2000 | Gurner et al. | 348/586 |
| 6,118,498 A | * | 9/2000 | Reitmeier | 348/725 |
| 6,219,837 B1 | * | 4/2001 | Yeo et al. | 725/38 |
| 6,334,217 B1 | * | 12/2001 | Kim | 725/38 |
| 7,849,487 B1 | * | 12/2010 | Vosseller | 725/88 |
| 2001/0001160 A1 | * | 5/2001 | Shoff et al. | 725/51 |
| 2002/0087973 A1 | * | 7/2002 | Hamilton et al. | 725/32 |
| 2002/0194589 A1 | * | 12/2002 | Cristofalo et al. | 725/32 |
| 2003/0161395 A1 | * | 8/2003 | Byers | 375/240.01 |

OTHER PUBLICATIONS

Rob Koenen, "Overview of the MPEG-4 Standard", International Organisation for Standardisation, ISO/IEC JTC1/SC29/WG11 N4668, pp. 1-80, Mar. 2002, [Internet] http://www.chiariglione.org/mpeg/standards/mpeg-4/mpeg-4.htm, printed Aug. 23, 2004.
Michael Robin, "Video compression", Broadcastengineering.com, pp. 30, 32, 34, Nov. 2002.
ISO/IEC 14496-12, Information technology—Coding of audio-visual object—Part 12: ISO base media file format, pp. 1-55, First edition, Feb. 1, 2004.

* cited by examiner

*Primary Examiner* — Chenea Smith
(74) *Attorney, Agent, or Firm* — David R. Stevens; Stevens Law Group

(57) ABSTRACT

Efficient channel surfing in a compressed frame television system is provided by receiving and storing compressed frames representing unwatched channels. Then, when a viewer selects one of the unwatched channels for viewing, the corresponding compressed frame is retrieved from memory and is displayed until a sufficient number of frames are received for that channel to provide for normal viewing of that channel. Corresponding audio clips may also be stored in memory and retrieved and played when the corresponding channel is selected for viewing. Program data may also be stored for unwatched channels for later retrieval and display. Preferably, one tuner/decoder pair is utilized to display programs for selected channels, while a second tuner/decoder pair is utilized to capture and store compressed frames for unwatched channels.

32 Claims, 3 Drawing Sheets

CHANNEL SURFING COMPRESSED TELEVISION SIGN METHOD AND TELEVISION RECEIVER

CROSS REFERENCE TO RELATED APPLICATIONS

This application claims priority from my provisional patent applications: application No. 60/393,322 entitled "Channel Surfing System and Method" and filed Jul. 1, 2002; application No. 60/402475 entitled "Channel Surfing System and Method" and filed Aug. 8, 2002; and application No. 60/429,723 entitled "Channel Surfing System and Method" and filed Nov. 27, 2002.

FIELD OF THE INVENTION

The present invention generally relates to television technology and, more specifically, to television channel surfing in a system utilizing compressed video on multiple channels.

BACKGROUND OF THE INVENTION

MPEG video compression is used in many current and emerging products. It is at the heart of digital television set-top boxes, DSS, HDTV decoders, DVD players, video conferencing, Internet video, and other applications. These applications benefit from video compression in the fact that they may require less storage space for archived video information, less bandwidth for the transmission of the video information from one point to another, or a combination of both.

The acronym "MPEG" stands for Moving Picture Expert Group, which worked to generate the specifications under ISO, the International Organization for Standardization and IEC, the International Electrotechnical Commission. What is commonly referred to as "MPEG video" actually consists at the present time of two finalized standards, MPEG-1 and MPEG-2, with a third standard, MPEG-4, in the process of being finalized. The MPEG-1 & -2 standards are similar in basic concepts. They both are based on motion compensated block-based transform coding techniques.

In MPEG and other compressed television systems, three types of compressed video frames are typically used: "I" or intra, "B" or bi-directional, and "P" or predicted compression frames. The various compressed television systems known to the person of ordinary skill are quite complex, and include both transmission and storage type systems. For purposes of explaining the field of art and preferred embodiment relative to the present invention, a simplified general explanation of a typical compressed television system follows. It will be understood that this simplified general explanation is given as an aid to understanding the invention and not by way of limiting the invention to a particular type of compressed television or image system or application. An I frame is encoded (i.e. compressed) using primarily (or only) data for that frame, whereas a P frame is encoded using data from a given frame and one or more previous frame or frames, and a B frame is encoded using data from a particular frame as well as from a frame or frames before, and a frame or frames after.

In order to decode (i.e. decompress) an I frame, only the data for that compressed frame is required. In order to decode a P frame, the data for the preceding frame is generally required, thus resulting in the need to receive all of the data for frames including and since the previous I frame. In order to decode a B frame, the frames before and after the B frame are required, thus most or all of the frames including and since the previous I frame are needed, plus at least one P frame after that B frame. Actual systems are more complex and may deviate from the explanations given above and below, however these simplified rules and explanations given herein will aid one of ordinary skill in understanding the present invention.

To facilitate this form of compression, streams of data for compressed frames are typically reordered and transmitted, with an I frame typically being transmitted first, followed by all of the data for the subsequent P frames, followed by all of the data for the subsequent B frames. The original B frames are normally intermixed with the P frames. This reordering aids the decoder in its task by generally making data available in the sequence that it is used in decoding. Upon receipt, a decoder, starting with the I frame data followed by the next P and B frame data, is able to reconstruct (decode) the I frame, then the P frames, then the B frames, and finally will reorder the reconstructed frames to put them into proper sequence, after which they are displayed.

It can be recognized that the decoding of frames does not necessarily occur in the same sequence that the frames are originally received by the encoder, thus leading to the reordering. The reordering and other manipulation of compressed and uncompressed video data may result in a considerable latency between the time a given frame is presented to the encoder and output from the decoder. This latency can vary significantly with the content of the video signal being distributed by such compression systems.

Viewers of television and other entertainment programs frequently wish to "skip around" the available program(s), i.e. to change from program to program. This desire is present whether the program(s) are being broadcast via various known electronic methods or stored by various known electronic, optical or magnetic methods, or combinations thereof, and this desire likely will manifest itself in relation to other as yet unknown methods of conveying programs to human beings. For example, in a common television receiver with a personal recorder, the viewer may wish to skip around between and among currently broadcast programs and previously recorded programs, stopping briefly at each program to view a short segment. After viewing the short segment the viewer will then move on to another program until finally deciding a particular program is of interest. This skipping around is presently commonly known, and will be defined and referred to herein in respect to human viewers, as "channel surfing".

Whenever a decoder acquires a new compressed video data stream, for example when the viewer channel surfs by changing channels, changing from one section of a recorded program to another or changing from one (recorded or broadcast) program to another (recorded or broadcast) program, it must currently wait until a new I frame is sent (or available) before it can start to decode the video frames. If, as is often the case, the decoder acquires the new data stream somewhere in the sequence of P or B frame data, it can do nothing until the next I frame is received, consequently there will be no image displayed corresponding to the new video stream until that time. Most commonly the decoder will display a black screen (i.e. a black image is displayed on the display screen) during this waiting period, which black screen and delay can be highly annoying to the viewer. Additionally, it is often the case that the television receiver takes some considerable time to acquire the data stream for each program, whether that program is being broadcast or played back from a previous recording. This considerable time is caused by various electronic circuitry having to automatically readjust itself to various parameters relating to the receipt of data for the new program, as well as for the data of the new program. For example, a new program which is being transmitted may require a tuner and decoder to acquire the carrier signal, lock to it, provide the raw data from the carrier, and decode that data. Similar acquisition is necessary for recorded programs. In addition, the program data itself is often different thus requiring more acquisition delay, for example having a different scanning format such as 16:9 wide screen or 4:3 standard aspect ratio and associated differing resolution and scanning properties.

With improvements in MPEG system encoders and encoding algorithms, as well as statistical multiplexing of several programs over particular transmission and recording equipment, I frames are being transmitted less and less frequently, often only every few seconds. When channel surfing the lack of I frames, sometimes coupled with acquisition time delays, often cause long delays of several seconds in displaying images when a new channel or program is selected. These delays, compounded by the large number of channels or programs in many systems, makes channel surfing a very slow and frustrating experience for the human viewer.

It would thus be advantageous to rapidly provide a viewer of compressed television programming accurate video representations of current programs on different channels when the viewer is channel surfing. It would also be advantageous to do such in an economical and efficient manner.

BRIEF SUMMARY OF THE INVENTION

Efficient channel surfing in a compressed frame television system is provided by receiving and storing compressed frames representing unwatched channels. Then, when a viewer selects one of the unwatched channels for viewing, the corresponding compressed frame is retrieved from memory and is displayed until a sufficient number of frames are received for that channel to provide for normal viewing of that channel. Corresponding audio clips may also be stored in memory and retrieved and played when the corresponding channel is selected for viewing. Program data may also be stored for unwatched channels for later retrieval and display. Preferably, one tuner/decoder pair is utilized to display programs for selected channels, while a second tuner/decoder pair is utilized to capture and store compressed frames for unwatched channels.

DETAILED DESCRIPTION OF THE INVENTION

Figure 1:
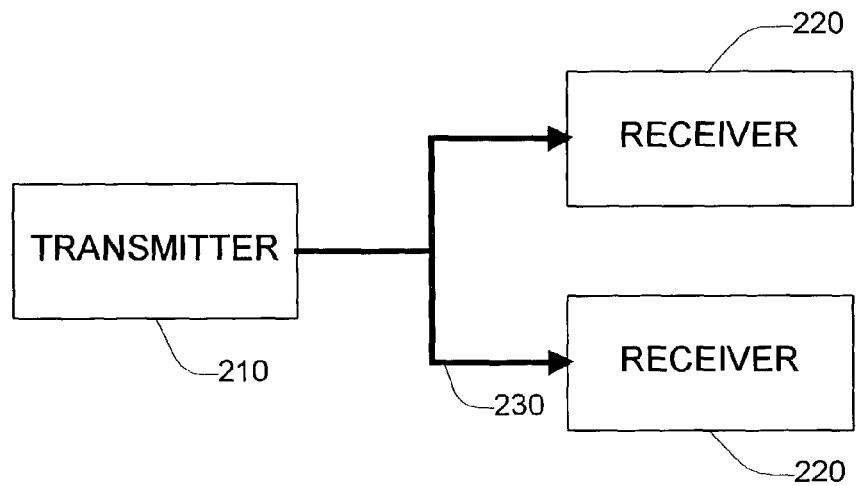
FIG. 1 is a block diagram illustrating a typical television broadcast system, in accordance with the prior art.

In simple terms, the preferred embodiment of the present invention facilitates fast television channel surfing by receiving and storing small quantities of programs, for example video frames or clips and/or audio segments or clips, related to one or more channel(s) or personal recorded programs not currently being viewed. Those small quantities may be taken from the associated channel (or personal recording) or may be taken from another source, and are stored in a suitable storage medium. When changing to a new channel, the small quantity of program corresponding to the newly selected channel is immediately recalled from storage and displayed, while the tuning and decoding mechanism are acquiring and decoding the program from the new channel. In this fashion, a small amount of recent new channel program (or personal recorded program) is displayed to a viewer while a tuner and decoder are acquiring the new channel (or the personal recorder is retrieving a new program) and often before the program from the new channel (or personal recorder) is otherwise available for viewing. This action facilitates channel surfing by allowing the viewer to immediately decide (based on the small quantity of recent program which is displayed) whether to stay with the newly selected program, return to the previous program or skip to yet another new program. While the preferred embodiment of the invention is used in consumer television systems, it will find applicability in computer (internet) systems as well as mobile and handheld devices.

One advantage of a commercially valuable embodiment of the present invention is to overcome a problem of long decoding delays in systems where channel surfing is desirable, such as in receiving systems which broadcast several channels. The present invention includes a system and method for obtaining and storing full or reduced resolution I frames for one or more of the channels which are not currently being viewed, allowing the stored I frames to be used as a quick visual presentation in the event the viewer wishes to surf to a new channel.

In the preferred embodiment of the invention, the system and method transmits all of the I frames for one or more channels which are not currently being displayed to the viewer's decoder. The transmission of the I frames is preferred to be on a separate channel which is dedicated for this purpose, but may be by alternate methods, including the normal transmission of the other (non viewed) channels and transmission via other types of communications channels. Recent I frames for one or more of the non displayed channels are temporarily stored so that when the user surfs to a new channel, the most recent (or a relatively recent) I frame can be immediately displayed and held frozen until the next I frame is received.

Note that an I frame which is received and/or held does not need to be a full resolution and full quality I frame, since the display of a reduced resolution and/or reduced quality I frame is typically preferable to a black frame being displayed while the viewer surfs. Neither does this I frame need to be one of the I frames which is transmitted on the regular channel, nor need it even be derived from the program frames which are encoded and transmitted. This I frame simply is desired to be a visual representation of the program's visual image which is being currently transmitted. In some instances the representative frame could simply be a logo or other image which is representative of the program visual image. For example a photograph of the president could be utilized to signify a speech by the president. To distinguish between the program I frame and these representative I frames and equivalent representations, the representative I frames and equivalent representations will be referred to as I' (I prime) frames. Note that with this definition, an I' frame may very well be an I frame, but does not need to be so, and may vary from time to time as desired by the program operator. It is preferred that I' frames be intra frame encoded, or alternatively be otherwise coded in a manner which facilitates fast decoding at the viewer (e.g. receiver) location as compared to normal decoding of the program which may be slowed by waiting for an I frame or the use of B or P frames or similar types of coding which may tend to delay viewing of images from recently or newly selected programs. It should also be noted that I' frames do not need to be constrained to one complete frame of video but may very well be a partial frame or multiple frames, motion clips or otherwise as will be discussed further below. Also, it is preferred that I' frames be of the same size as (but reduced resolution to) the corresponding I frames. Nevertheless, they may be displayed in reduced size, such as in thumbnails, PIP (picture in picture), or POP (picture outside of picture), if desired.

An important feature of the present invention is that in many instances a viewer will recognize from this (lower quality) I' frame that the corresponding program is not something he wants to watch and can immediately move on to the next channel. The capability to provide a relatively fast display of a recent I frame or of an I' frame, which otherwise represents the visual images being transmitted, greatly facilitates the viewer's channel surfing. This inventive system and method allows faster channel surfing and greatly reduces the amount of time a user must wait for program video or other information to be displayed or played when surfing or otherwise changing to a new channel or program.

Several methods of transmitting and/or reducing the number of I' frames to be transmitted/received/stored can be utilized. For example one or more dedicated program channels or communications channels can transmit I' frames for the system, or for all of the channels in a particular subscription package, or other conveniently selected group of programs. Such an I' frame channel can be received with a separate tuner, or with the main tuner when surfing or with a specialized communications link or a general data path. For example the current U.S. digital television transmission standards provide for several different types of data which may be carried with a digital television signal, any of which could be utilized to practice the present invention. The channel does not need to be a regular system channel, rather it can be specialized for the purpose and may be transmitted over the same medium as the regular program channels, or otherwise sent in real time or non real time via other suitable manner to a viewer's receiver. I' frames which are transmitted on the dedicated channel(s) do not need to be the most recent I frames, or a full quality and resolution I frames, since it is only necessary to provide suitable video for the viewer to establish a degree of visual information about the program being carried on the channel to which the viewer has just tuned to as described elsewhere herein.

In respect to the use of the invention with stored programs or distribution channels, such as by any of the various storage and distribution methods presently known or which will become known, I' frames may be carried with the same storage medium as the stored programs, or different portions of the same storage medium or with different medium. As one example, I' frames may be stored on the same DVD as a movie, or in a movie server having several DVDs storing several programs. The I frames may be stored on each DVD for the programs stored on that DVD, or on a common DVD for the programs stored on all of the DVDs in the movie server. One of ordinary skill in the art will recognize from the present teachings that there are many useful variations and combinations of storage and/or transmission of programs and I' frames, which variations and combinations may be tailored or optimized for particular applications.

For example, it is not necessary to transmit a full quality, full resolution, full size image in order to convey to the viewer that a western style program is being transmitted or played. A low quality and low resolution image will be sufficient to allow the viewer to recognize that a western is being transmitted or played back on that channel. If a viewer has no interest in westerns, he can then move to another channel or playback on without the frustration of waiting several seconds for the next I frame to be transmitted, or conversely if he has an interest he can then wait for the current video to be displayed. Additionally, audio clips can be sent with these I' frames to provide a short amount of audio to accompany the I' frame. The audio clip, accompanying the I' frame, may be, but does not need to be, the program audio. It is preferred that the audio clip be representative of the audio portion of the program being transmitted at the time. Audio only systems, such as common radio type programming, and systems including both audio and video channels may also benefit from the present invention as will be discussed further below.

As a further example, in an 700 channel system, comprising channels 100-800, channel 100 may be dedicated to transmitting I' frames for the other 699 channels. When receiving channel 500, a viewer decides to channel surf to channel 501. At the time that the viewer changes channels, a separate tuner would have already received and a memory would already have stored the last I' frame for channel 501. As soon as the user changed to channel 501, that last I' frame received for that channel is displayed (and the audio clip played if there is one) until the next I frame for channel 501 is received as part of the normal reception.

As an alternative embodiment, only 1 tuner is utilized, and as soon as the viewer selects channel 501, the tuner tunes to channel 100 to obtain the next transmitted I' frame (and audio clip if used) for channel 501, and displays that I frame (and audio clip) when received. This embodiment assumes that the I' frame for channel 501 is transmitted on channel 100 before a regular I frame is transmitted on channel 501. Such may well be the case if the I' frames transmitted on channel 100 are low resolution and/or low quality, and thus transmitted more often, as compared to the regular I frames transmitted on channel 501. As another alternative, the single tuner may jump back and forth between the viewed channel 500 and I' frame channel 100 (or other channels) to acquire I' frames for one or more channel other than 500 and place these I' frames in memory. When the viewer selects channel 501, the corresponding I frame which has been stored in memory is recalled and displayed while the tuner and decoder are acquiring the channel 501 program. This operation will be explained in more detail below.

As another alternative, a second tuner (or the single tuner) may sequentially scan through one or more of the channels which are not being currently viewed, waiting for an I frame (and audio clip if desired) which is then stored, after which the tuner moves to another channel which is not being viewed and waits again. Although this is a relatively slow process, it nevertheless will provide relatively recent I frames to be used as I' frames, with these I' frames typically being far preferable to a black screen for the channel surfing viewer. The stored I frames, which in effect become I' frames, may be stored as received, or only lower quality/resolution versions stored. As an example, in a 50 channel system, which transmits I frames at an average of every 4 seconds, the second tuner typically will have scanned all 50 channels in no more than 3.3 minutes. If I frames are transmitted at random from channel to channel and dependent on video content, the actual time necessary to scan all 50 channels will often be much shorter.

Additionally, it may be desirable to force the encoders for the 50 channels (or at least for a plurality of channels) to be responsive one to another or to a common signal in order that the I frames are transmitted in a fashion such the I frame scanning at the receiver takes place much faster. For example, if channel 500 is caused to transmit an I frame at least every 4 seconds, and channel 501 is caused to transmit an I frame within a short period after channel 500 transmits its I frame, channel 502 a short period after 501, and so on, an I frame tuner at a decoder location will be able to quickly scan from channel 500 to 501 to 502, etc. because of the sequential nature of I frame transmission on these channels. Of course, this example is simplistic and actual schemes to accomplished timed, synchronized, or other interrelated I frame transmission may be much more complex depending on the system which makes use of this inventive feature.

The period used by the encoders in such an interrelated embodiment may be a fixed period, a variable period, a not to exceed period, or a window period. The period may be determined in time units or other units. For example to transmit the I frame during a period not to exceed an amount after the triggering event (such as for example a triggering by transmission of the I frame in the related channel), or may set within a window, for example not before a first amount but before a second amount after the triggering event, or may be at a fixed amount after the triggering event.

These amounts of the periods may be time periods or may be related in other constant or variable amounts, for example such as clock cycles, incoming frames, transmitted frames, seconds, or variable amounts. One variable amount which may be used for example is the latency of video frames passing through the encoder. Each amount scenario has advantages which may be utilized in a particular system. Because the tuner and decoder at the receiving end will require a finite time to tune, receive, and decode an I frame, it may be desired to ensure that the next I frame on the next channel is not sent until the tuner has completed that task. By shortening the period during which the next I frame is sent, the speed of receiving I frames for all channels is increased, but the bandwidth required to transmit these I frames and correspondingly their associated programs is increased, since I frames contain much more data than P and B frames. Consequently for a desired system bandwidth there will typically be a minimum and maximum I frame transmission rate which is desired.

In more complex delivery systems, for example those using statistical multiplexing, it is desired to change the rate of I' frame transmission, and correspondingly the minimum and maximum periods described above, in response to the video content. This allows transmitting additional I' frames for a given channel when bandwidth requirements are low and fewer I' frames when bandwidth requirements are higher. For example, in low change program scenes, very few I' frames are normally required, and it may be useful to add a few otherwise unnecessary I' frames to facilitate I' frame receipt at the receiver end.

The above is not the sole consideration however, since the transmission of additional, otherwise unneeded, I' frames unnecessarily increases the required transmission bandwidth. It is typically useful to skip over or reduce I' frame transmissions for channels whose programs contain little or no change. For example, if the President is giving a speech, repeated transmission of I' frames of that scene provides little useful information over and above that of the original I' frame. A code, command, or other similar instruction could be sent to a receiver to cause the receiver's I' frame receiving and storing circuitry to skip over this channel and continue with the next channel in sequence, or to go to a different channel. This inventive feature overcomes a need to send otherwise unneeded I' frames solely to facilitate receipt of current I' frames by the receiver.

The above described features may be applied to dedicated channel transmission of I' frames as well where statistical transmission of I' frames based on program content or other criteria as described above, and may be suitably incorporated into any embodiment of the present invention as desired. Such schemes for controlling the rate and sequence of transmission of I' frames for plural channels are desirable, but typically add to complexity and cost of practicing this invention. Accordingly one of ordinary skill in the art will know from the present teachings to optimize the practice of the invention to achieve a desired combination of performance, quality, and cost.

With any above embodiment of the present invention, the receipt and storage of I' frames may be tailored to the past or current surfing and/or viewing habits of one or more viewers. For example, there is little need to store recent I' frames for a channel which a viewer never watches. As another example, if a viewer is surfing the channels in an increasing direction, the search may be desired to also take place in an increasing direction for channels which are somewhat above the channel being currently viewed. For example, if the viewer surfs channels 500, 501, 502, etc, then it would be useful to search channels 503, 504, 505 in advance. If a viewer is watching channel 500, the second tuner could give priority to receiving I' frames from one or more immediately higher and lower channels, such as for channels 501, 502, 499 and 498, in anticipation of the viewer surfing in either direction. If a viewer has a number of channels which are frequently viewed, it may be useful to obtain I' frames for those channels on a higher priority and/or more frequent basis than for other lesser-viewed channels. When viewing information for several viewers is stored, the receiver may change its activity based on the particular viewer watching at the time, with identification of that viewer being made by direct input by the viewer, or alternatively by comparing the current viewing habits with the stored viewing habits for that viewer.

FIG. 1 is a block diagram illustrating a typical television broadcast system, in accordance with the prior art. A transmitter 210 transmits television signals across a transmission medium 230 to one or more receivers 220, where television programs are displayed. In the case of compressed video, such as MPEG, the transmitter 210 will contain an encoder (not shown), which compresses and encodes video for transmission. Similarly, the receivers 220 will contain one or more decoders (not shown) in order to decode the compressed video signal, prior to displaying the decoded video on a display (not shown). The transmission medium 230 may be radio waves through the air, cable television lines, digital cable television lines, fiber, the Internet, satellite, or any other similar or equivalent medium for transmission of television programming, as currently known, or later developed.

Figure 2:
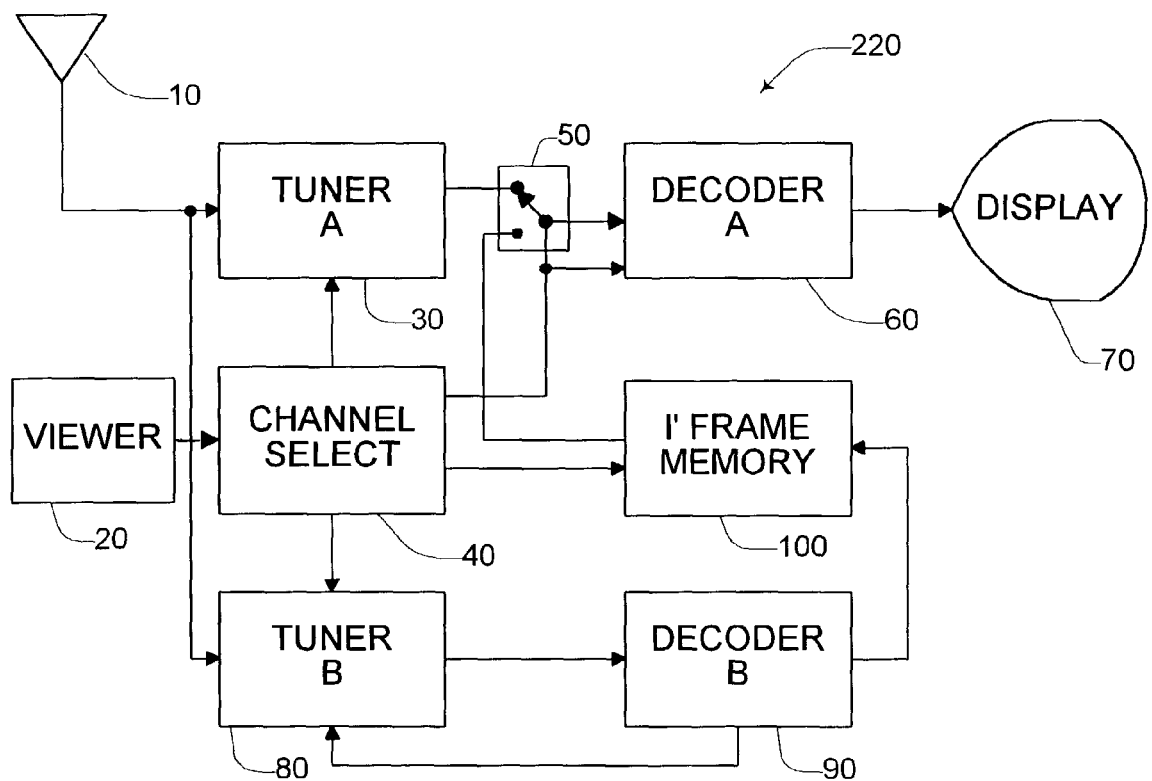
FIGS. 2, 3, 4, and 5 illustrate four embodiments of the present invention wherein a viewer controls a receiver, as shown in FIG. 1, in order to view television programming on a display.

FIG. 2 shows by way of example a first embodiment of the present invention as used with a system broadcasting via ether, such as over the air or satellite. This is illustrative only, as it should be understood that the present invention is designed to operate with television transmissions over other types of transmission media 230. This FIG. comprises a receiver 220 and a viewer 20 controlling the receiver 20, for example by using a remote control device as is well known in the art, and viewing television programming on a display 70. The receiver 220 may be separate from the display 70, or may be integrated into a single unit, both of which configurations are known in the prior art.

An antenna 10, suitable for receiving a plurality of broadcast video channels, is coupled to channel Tuner A 30 and Tuner B 80. Alternatively, each Tuner 30, 80, may be coupled to a different antenna 10. Tuners A 30 and B 80 operate to select a particular channel for reception as is commonly known in the art. Two Tuners 30, 80 and one antenna 10 are shown. However, additional tuners and/or antennae are also within the scope of this invention. Viewer 20 interacts with channel select element 40 to select a particular broadcast channel to watch with channel select element 40 being coupled to Tuner A 30 to perform that selection as is commonly known in the art. The compressed video and audio data from the selected channel is coupled from Tuner A 30 to Decoder A 60, where the data is decoded into an audio and video program, which in turn is coupled to a Display 70 for viewing by viewer 20, as is commonly known in the art.

FIG. 2 includes additional inventive features consisting of a second Tuner B 80, which also operates to select a particular channel for reception, as is commonly known in the art, with the compressed audio and video data from Tuner B 80 being coupled to decoder B 90, which operates to identify an I frame of the selected channel, and stores that I frame as an I' frame in I' frame memory 100. Alternatively, an audio clip may be recovered and stored in an audio clip memory (not shown) as well. When the I' frame is stored in I' frame memory 100, Decoder B 90 (or channel select 40 operating with Decoder B 90) operates to cause Tuner B 80 to tune to another channel, which channel may be selected by being the next in sequence, or may be selected according to a prearranged set of criteria as discussed above. The operation of Tuner B 80 and Decoder B 90 may continue unabated, storing in I' frame memory 100 the I' frames for each of the channels selected by Tuner B 80.

When the viewer 20 changes channels, channel select 40 operates to momentarily change switch 50, and to read the stored I' frame (and audio clip if used) corresponding to the newly selected channel from I' frame memory 100, so that the I' frame (and audio clip if used) are presented to decoder A 60, which decodes and displays the video (and audio) via display 70. Immediately thereafter, when Tuner A 30 has acquired the new channel, the channel select 40 causes switch 50 to select the output of Tuner A 30 to enable normal reception of the newly selected channel program. Note that Decoder A 60 is preferred to contain an internal memory which maintains the display of the I' frame (and audio clip if used) until normal reception of the newly selected channel begins.

It may be noted that FIG. 2 shows the storage of I' frames in I' frame memory 100, which stored I' frames are subsequently decoded by Decoder A 60. It may at first impression appear that the I' frames are decoded twice, or that one of the decoders 60, 90 is redundant. In practice, it is preferred that Decoder B 90 merely operate to provide only so much decoding as is necessary to identify I' frames, for example, by decoding headers, metadata etc. and performing error correction, and causing a still compressed I' frame to be stored in memory 10. By storing compressed I' frames, memory usage is kept to a minimum, thus improving access time to the I' frame memory 100 and reducing memory cost. Compressed I' frames taken from I' frame memory 100 thus typically need to be fully decoded to a displayable image by Decoder A 60, in order that these I' frames may be displayed on display 70. Reduced resolution and/or quality I' frames may be stored or displayed as well as discussed herein.

Alternatively, fully decoded and displayable I' frames may be stored in I' frame memory 100. However, this typically requires the use of a larger memory and thus typically results in higher cost. The fully displayable I' frame may then be directly coupled to Display 70, when desired, either by passing through Decoder A 60 without further decoding (in response to or under control of Channel Select 40) or by direct coupling to the output of Decoder A 60, or to Display 70 (not shown). While more costly, this configuration provides an advantage of allowing for immediate display of I' frames (i.e. without waiting for decoding) and allowing for Decoder A 60 to immediately start searching for and decoding new I frames from a newly selected channel (from Tuner A 30). The figures herein show the use of double decoders 60, 90 as described above, and it will be understood from the present explanation that either configuration may be utilized as desired, i.e. storing compressed or only partially decoded I' frames, or storing fully decoded and ready to display I' frames, and additionally only one decoder needs be used.

Figure 3:
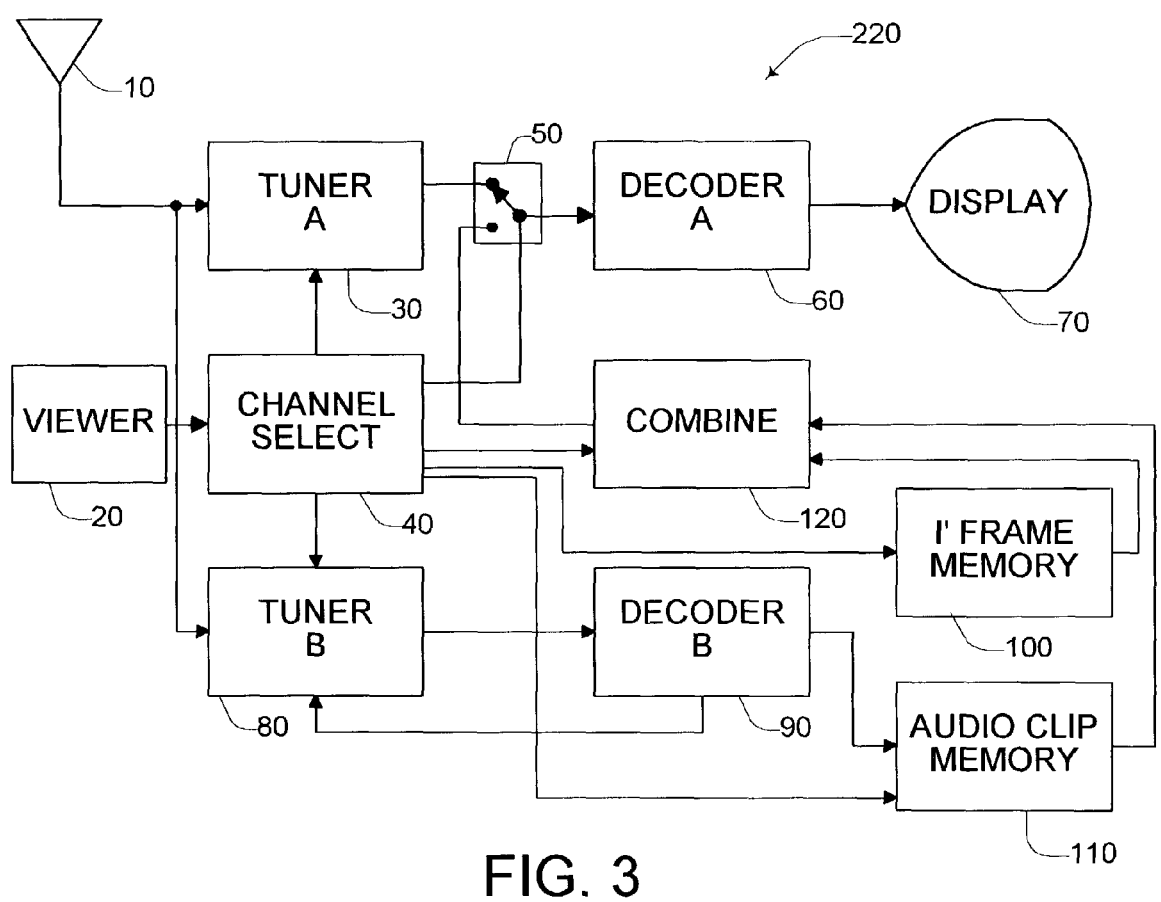

FIG. 3 shows by way of example a second embodiment of the present invention. As with FIG. 2, FIG. 3 comprises a receiver 220 and a viewer 20 controlling the receiver 220 and viewing television programming on a display 70. FIG. 3 is similar to FIG. 2 and has common elements 10-100, and additional audio clip memory 110 for storing audio clips.

The receiver 220 shown in FIG. 3 differs from the receiver 220 shown in FIG. 2 in that separate audio clip 110 and I' frame 100 memories are shown, with combiner circuitry 120 to combine this stored data into a data stream which is similar to the data stream out of Tuner A 30, and thus compatible with the input of Decoder A 60. Alternatively, I' frame and audio clip data may be separately coupled to Decoder A 60 via suitable means as will be known to one of ordinary skill in the art. Tuner B 80 of FIG. 3 differs from FIG. 2 in that it receives a dedicated channel of I' frame data and audio clips for the various channels. As in FIG. 2, when viewer 20 changes channels, channel select 40 operates to momentarily change switch 50 and to read the stored I' frame (and audio clip if used) from memory 100, 110, so that the I' frame (and audio clip if used) is presented to Decoder A 60, which decodes and displays the video (and audio) via display 70. Immediately thereafter, channel select 40 causes switch 50 to select the output of Tuner A 30 to enable normal reception of the newly selected channel program. The variations relating to storage of I' frames, decoding and arrangement of connections and components described with respect to FIG. 2, are also applicable to FIG. 3.

It may be noted that various other ways of carrying out the invention may be implemented. For example, when it is preferred to store compressed I' frame and audio clip data for reasons of memory efficiency, there is also the possibility of storing decoded audio and/or video so that the stored information may be coupled directly to Display 70 without subsequent decoding. Such an embodiment may be realized by coupling the audio 110 and/or I' frame 100 video memory to the output of Decoder A 60, and moving switch 50 to select the input of Display 70. As another embodiment, more than a single I' frame may be stored, with the amount of video or audio stored being merely a matter of storage cost and desired storage time. The many individual features and variations discussed herein may be implemented by rearrangement and/ or adjustment of the various connections and elements of FIG. 2 or 3, as will be known to the person of ordinary skill from the teachings herein. Important to the preferred embodiment of the present invention is that some information is stored which is representative of the current or recent visual and/or audible portion of a newly selected program being transmitted in order that this information may be displayed while Tuner A 30 and Decoder A 60 are acquiring the newly selected program. Many other variations on the preferred embodiment will be known and may be resorted to by the person of ordinary skill in the art from the teachings herein.

By using a plurality of tuners, various other functions can be combined with the channel surfing capability. For example tuners (and/or memories) can be used for viewing, storage, surfing, PIP (picture in picture), POP (picture outside of picture), I' frame reception, etc. By using a plurality of tuners, a processor can manage tuner resources to cause the various tuners to provide data according to a predetermined, video responsive, viewer responsive or viewer programmed priority list. For example a tuner can be used for PIP if the viewer desires, but if not, it can be used to receive I' frames in anticipation of channel surfing, or if the viewer 20 is actually surfing, it can be used to receive I' frames in immediate advance of the instant surfing channel and direction. Clearly, the more tuners that are utilized, the more convenient and useful the receiver will be to the viewer 20. With more tuners, the control function of channel select element 40 increases in complexity. However, the proper design of such capabilities is within the skills of one of ordinary skill in the art from the teachings herein. As one example, the tuners can be assigned (or controlled) to perform various tasks by the channel select element 40, depending on what the viewer 20 wishes to view. If the viewer 20 is simply viewing a program, a tuner can be dedicated to that viewing function, and the other tuners (if any) are all available to receive I' frames. If the viewer 20 is viewing a program, a tuner is assigned to that task, and if the viewer 20 then wishes to view a PIP, another tuner is assigned to that task, with the remaining tuners (if any) available to receive I' frames. A PIP tuner can be caused to alternate between the tasks of receiving the PIP program and receiving I' frames, with equal or unequal priority. For example the PIP tuner might receive I' frames after every PIP program GOP, or might receive I' frames every second or every minute. Tuners and decoders may be of differing quality and/or complexity as it will be recognized that certain tuners may be most commonly used for receiving information such as I' frames or PIP images which do not require full resolution and/or quality.

Figure 4:
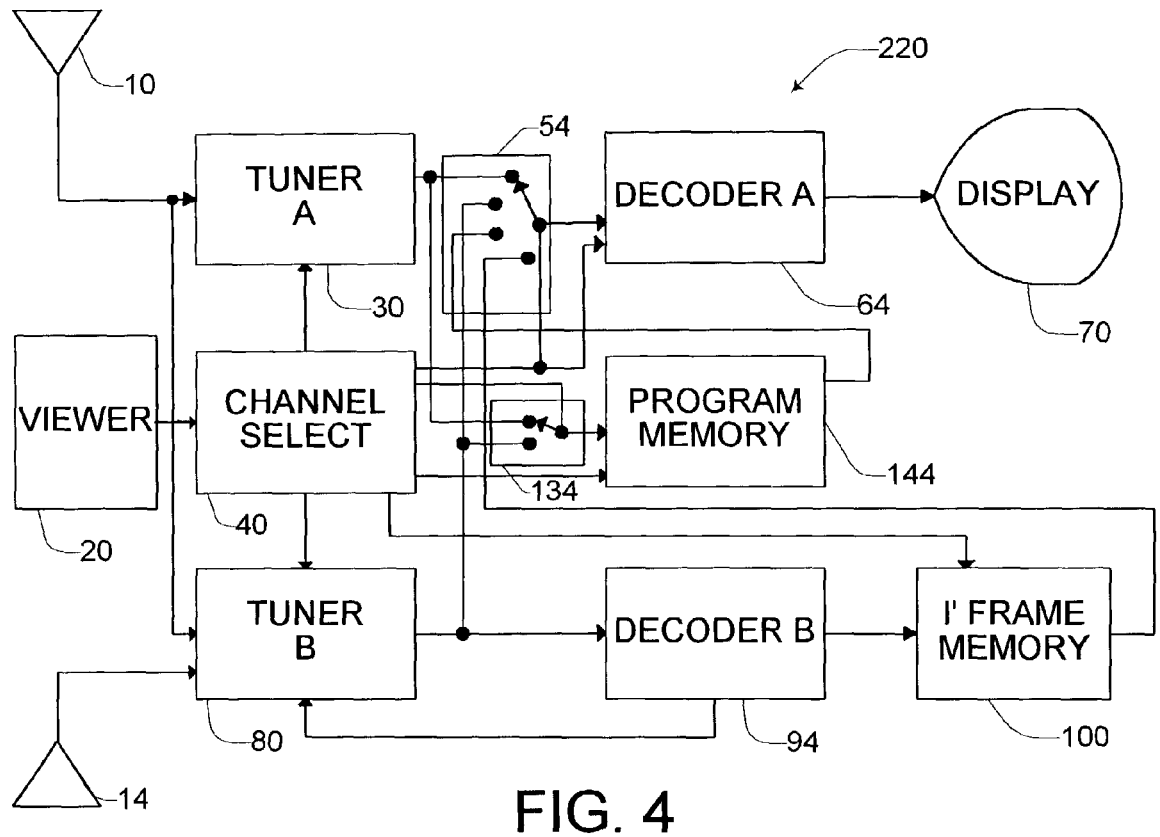

FIG. 4 shows by way of example a third embodiment of the present invention which includes elements 10-100 as described in respect to FIGS. 2 and 3, and further includes alternate or second antenna 14, as well as program memory 144 and program memory input selector 134. As with FIGS. 2 and 3, FIG. 4 comprises a receiver 220 and a viewer 20 controlling the receiver 220 and viewing television programming on a display 70. Note that while program memory 144 is shown as separate from I' frame memory 100, it may be more cost effective to combine or share these two elements in a single memory or in overlapping shared memories. In particular the memory 144 or memories 144 and 100 may be partitioned between relatively fast and relatively slow memories, to facilitate their required operation.

For example, operations such as quickly recalling I' frames which are likely to be needed in the near future because the viewer 20 is presently engaged in some form of channel surfing could be achieved by using faster memory, and operations which do not, or probably do not, require such speed can be achieved by using slower memory.

Program memory 144 provides for storage of programming taken from either tuner A 30 or tuner B 80 as achieved by selector 134. Selector 134 may also provide for selection of I' frames if desired. In this fashion I' frame memory 100 may be eliminated. Other memory functions which are facilitated by the use of fast access and/or random access may be utilized as part of the present invention. For example, a fast buffer of program data is sometimes desirable to allow various viewing options, such as instant replay, commercial skip over, viewing pause, and/or program storage. Typically, these functions are provided by a circular buffer that stores some maximum amount of program data, with the program data being written into the buffer as it is received, and read out of the buffer in random access fashion under a viewer's 20 control. When the buffer is full, the oldest data is overwritten by new data, thus the buffer is continually updated, and holds an amount of the immediately past program data. For example, a 30 minute buffer may be utilized to store the past 30 minutes of a program, allowing the viewer 20 to skip back up to 30 minutes for instant replay, or if the viewer 20 is currently viewing delayed program material from the buffer, to skip forward, such as skipping over commercials. The buffer may be utilized in conjunction with slower memory to provide extra storage, or to provide these same features and capabilities with stored programs.

Selector 54 is shown capable of selecting the outputs of Tuner A 30, Tuner B 80, Program Memory 144, or I' frame Memory 100. Selector 54 may also select the output of Decoder B 94 and may be divided to provide inputs to Decoder A 64 and/or Display 70, as desired. As previously described with respect to the I' frame Memory 100, the program data stored in the program memory 144 may be compressed, partially decompressed, or fully decompressed and ready to display data. The choice of which to store is primarily one of cost versus performance. Accordingly, one of ordinary skill in the art will know from the present teachings to optimize the performance of the invention for particular applications and to locate and/or split the functions of selector 54 in order to appropriately couple program and I' frame data to Decoder A 64, through Decoder A 64 or to Display 70 matching the form of the program and I' frame data as required.

Because MPEG and other compressed transmission methods are capable of sending program information faster than it is viewed, it is possible for only one tuner to receive program information (for main viewing or PIP viewing) for a time, while storing the received excess program data in Program Memory 144. Such an embodiment could be implemented with any of the configurations of FIG. 4 or 5 without the second tuner 80 and decoder 94. When the memory 144 is sufficiently filled, the tuner 30 can then switch to receiving and storing I' frames for a short time, while the previously received program data is being read out of memory 144 to provide an uninterrupted program for the viewer 20. Of course, the output of the tuner A 30 would have to be suitably coupled to receive and store I' frames in memory 100. Alternatively the I' frame information may be multiplexed, for example time multiplexed, on the program channel with the tuner 30 receiving both program data and I' frame data, and coupling each to the respective path. It will be recognized that corresponding activities may be performed by the Decoder 64 as well. Consequently a single tuner 30 and single or plural decoders may be utilized to practice the present invention. In this fashion, no program information is missed by the viewer 20 while the tuner 30 is receiving I' frames. One of ordinary skill in the art will recognize from these teachings that a plurality of tuners may be time shared in various fashions to facilitate convenient viewing, surfing and other capabilities while reducing the delays inherent in receiving and decoding compressed programs. Alternatively, the program memory 144 can be coupled to receive and store fully decoded and ready to display program information from decoder 64, thus permitting Decoder A 64 to also be used to decode I' frames.

As another example of the usefulness of the instant invention, a form of channel surfing herein called "Ping-Pong" viewing may be facilitated by a plurality of tuners. Ping-pong viewing is a viewing mode wherein only a few channels are viewed in succession by a viewer 20. An example of such is viewing two or three sports games where one is viewed for a short time, followed by the viewer 20 jumping to another, which is viewed for a short time, followed by the viewer 20 jumping back to the first channel or to another channel. The jumping back and forth continues for some time with respect to a small number of channels, typically 2, 3 or 4. In this viewing mode, a plurality of tuners may be configured by the channel select element 40 to receive both the currently viewed program and the anticipated soon-to-be-viewed program. If sufficient size of memory 144 is provided in the receiver 220, and/or sufficient transmission bandwidth is available, one or more about-to-be-viewed channels may be stored in memory, so that when the viewer 20 jumps, he can pick up the program where he left off, or otherwise pick up the viewing at a point in the program which was transmitted previously to the time when the viewer 20 made the change to this program. With sufficient program transmission bandwidth, where one or more programs are transmitted faster than they can be displayed, these features may be accomplished with a single tuner and adequate memory. One commercially important feature of this invention is the ability to view one program while receiving and storing another program in memory, with the ability to swap back and forth such that the viewer 20 at substantially all times has the ability to view or review previously unseen programming without loss of any incoming programming. The viewer 20 may then choose which portions of programming to skip over, and which to view in detail, for example, skipping over commercials and/or commentator "fill" and viewing sports action.

In instances where memory is utilized with the present invention, it may be comprised of one or more known types, for example such as RAM, magnetic disk, optical disk, crystal lattice, or may comprise or include as yet unknown types of memory. The playback of programs stored in memory may take place at rates faster or slower than real time, with suitable artifact correction provided as desired, and jumping and random access capabilities may be provided in addition to, or separately from, such capabilities. Alternatively, for low hardware cost applications, a full (or partial) set of I' frames can be transmitted as non-program data along with each channel's program data. Most digital transmission and encoding standards provide space for sending (or storing) both program data and non-program data. Non-program data includes information such as metadata, user data, data space reserved for expansion, etc. For example, the non-program data areas of MPEG or digital television broadcasting data streams may be utilized to transmit I' frames. As a simplified example, consider a television system where channels 1-5 are transmitted. Channel 1 transmits channel I program data in the usual manner, plus I' frames for channels 2-5 in non-program data areas, which are provided within the channel 1 transmission format. Correspondingly, channel 2 transmits I' frames for channels 1 and 3-5, channel 3 transmits I' frames for channels 1, 2, 4, and 5, channel 4 transmits I' frames for channels 1-3, and 5 and channel 5 transmits I' frames for channels 1-4. Alternatively, Channel 1 transmits I' frames for channels 2 and 5, channel 2 for channels 1 and 3, channel 3 for channels 2 and 4, etc. Various other schemes will be known to one of ordinary skill from these teachings and may be resorted to in order to include this inventive feature in the practice of the invention with a particular system.

Of course, I' frames do not need to be transmitted (or received or stored) for each of the other channels in the system, and I' frames do not need to be transmitted (or received or stored) at the same rate (or with the same priority) for all channels or on all channels as previously discussed. As an example, a sports channel might also carry (or the television receiver receive and/or store) I' frames for only other sports channels on the assumption that a viewer will be surfing only sports channels. As another example, a sports channel might also carry (or the television receive and/or store) I' frames for other sports channels more frequently than it carries I' frames for other non-sports channels on the assumption that a viewer will be most likely to surf sports channels and less likely to surf non-sports channels. The mode, priority, or scheme for carriage (or the reception and/or storage) of I' frames can be adjustable in response to viewing habits, or in response to anticipated viewing habits of individual viewers or groups of viewers. A viewer who only watches sports channels, for example, can be accommodated by a television receiver which adjusts its I' frame reception and/or storage in response to these viewing habits, such that sports channel I' frames are received and/or stored with priority over, or to the exclusion of, other non-sports channel I' frames. The programming system monitors the viewer who for example watches only sports channels. The system adjusts its I' frame transmission and/or sending rate in response to these viewing habits, such that sports channel I' frames are sent with priority over, or to the exclusion of, other non-sports channel I' frames. Such adjustments in sending rate and/or transmission can also be responsive to the viewing habits of groups of viewers. The groups of viewers may be those viewing on a single receiver, or viewing in a geographical area, a time relative group, or any group selected to have statistically significant viewing habits.

As another improvement, a particular viewer or group of viewers (for example a family) can establish their own desired priorities and rates for receiving and/or storing I' frames. Additionally, the receiving system can automatically respond to and remember viewing habits for individuals or groups from a preset correlation of types of programs which are likely to be viewed by an individual. For example young children are likely to watch cartoons and not likely to watch news. Whenever a viewer watches a cartoon it is likely it is a young child and consequently the receiver can adjust its I' frame receiving and/or storing to give priority to cartoon and other young child programming over, or to the exclusion of, news or other adult programming. This adaptation of I' frame transmissions could, for example, apply to a single receiver, a household, a geographical area, a time window such as weekend mornings, or otherwise to statistically significant viewing habits.

Figure 5:
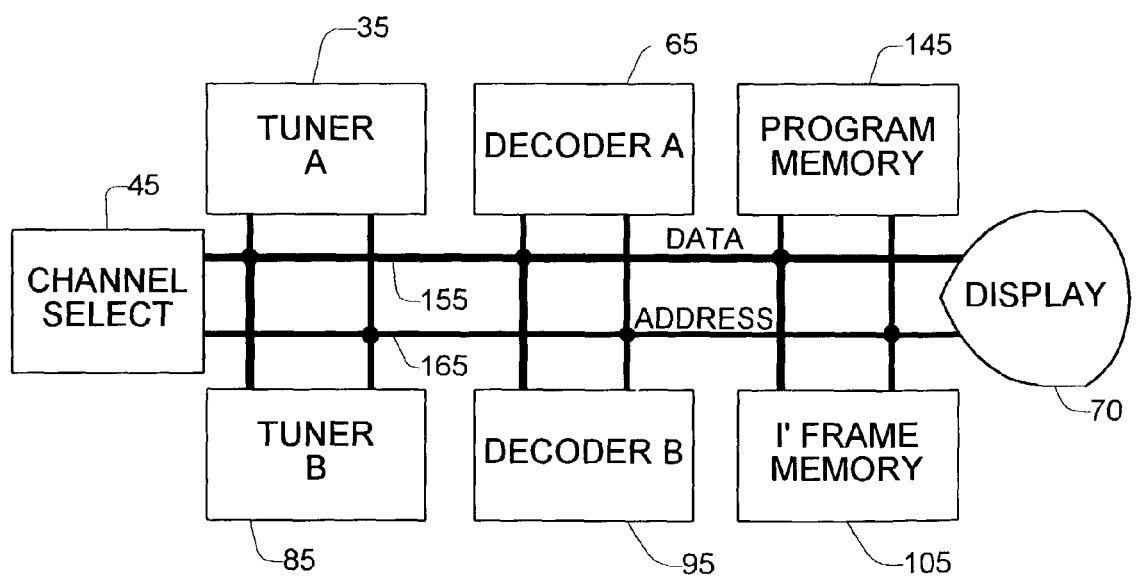

FIG. 5 shows one example of a fourth embodiment of the present invention which may perform the above described features and functions. The elements of the invention are configured so as to operate with one or more data and address bus in a Von Neumann (or computing) style operation. A receiver 220 comprises a Channel Select 45, Tuner A 35, Tuner B 85, Decoder A 65, Decoder B 95, program memory 145, I' frame memory 105, and display 70 coupled to a data bus 155 and an address bus 165. The functions and operations of elements 35, 45, 65, 70, 85, 95, 105, and 145, are similar to equivalently named elements 30, 40, 60, 70, 80, 90, 100, and 144, respectively, in FIGS. 2, 3, and 4. The functions and operations of address bus 165 and data bus 155 are well known in the computing arts.

The Channel Select 45 operates to interface with the viewer 20 (not shown in this FIG.) and to cooperate with, instruct, or control each of the other elements via address 165 and data 155 buses to interact and perform various tasks in various ways. For example the Tuners A 35 and B 85 are caused to tune to desired channels and output the data recovered from those channels on the data bus 155 (or data buses), which data is coupled to Decoders A 65 and/or B 95 to be decoded, and/or to I' frame memory 105 and program memory 145 to be stored. The memories 105, 145 may store compressed data, partially uncompressed data, or fully uncompressed data. For example, the uncompressed data from Decoder A 65 or B 95 may be stored in the memories 105, 145 to be accessed by the Display 70. Alternatively, compressed data from Tuners A 35 and B, which is stored in the memories 105, 145, may be recovered and coupled to Decoders A 65 and B 95, with the decoded data being coupled to Display 70. As mentioned previously, the tuners 35, 85, and decoders 65, 95 do not need to be of similar quality and/or performance, and additional tuners and/or decoders may be utilized as desired to achieve a particular cost, quality, and performance tradeoff Additionally, the storage and recall of I' frames will be accomplished according to the teachings herein. Other variations and configurations of connections and data flow will be known to the person of ordinary skill in the art from the teachings herein.

Data to and from various elements of the invention may be multiplexed on the data 155 or address 165 bus (or buses) or dedicated bus connections may be utilized as is well known in the art, thus enabling convenient and flexible configuration and reconfiguration of the elements to perform various functions and features as desired, including the aforementioned viewing, storage, surfing, PIP, POP, I' frame reception, instant replay, commercial skip over, viewing pause, and program storage.

The form of configuration of the present invention and its various features and functions may be changed from that given in FIGS. 2-5 to facilitate particular desired performance and features.

It will be known to one of ordinary skill in the art from the teachings herein that with any of the various embodiments and forms of the invention, fewer or more tuners, decoders, memories, displays, connections, buses, and/or channel select elements may be utilized, depending on the desired cost, performance, and complexity of the particular embodiment of the invention to be practiced.

This same channel surfing problem described above can also seriously slow down similar automated machine activities, for example, such as automatically acquiring frames or brief segments of programming for automated logging purposes. One example of a use of automated logging is the recording and preserving of short segments of broadcast programming for later proving and supporting billings for commercials which are included in that programming.

The above description has heretofore dealt with the visual portion of visual programming and optional corresponding audio clips by way of example and explanation. Similar problems exist however with other signals, for example, audio programming, whether related to visual programming, for example, such as in television and movies, or audio-only programming, for example, such as in radio. The invention will also find use with the transmission and storage of any other types of signals where it is desired to make changes from one data stream to another and those changes are slowed or otherwise hindered by the slow acquisition time of the data stream. One of ordinary skill in the art will know from the description of the preferred embodiment given by way of example with respect to television visual programming to utilize the invention with other types of signals to achieve similar benefits. Of course, the use of the present invention with such other signals will result in operation with aspects of those signals which utilize different elements and/or characteristics which one of ordinary skill will know from the teachings herein. As just one example, the use of I' frames which is described herein with respect to video signals will change to other types of compressed data which is representative of the current or recent past data of the newly accessed data stream.

One such type of compressed data is the graphics and other types of image and metadata information which is transmitted as part of MPEG 4 programs. Briefly, in MPEG 4 the program scenes are transmitted as the separate components which make up a program. For example, a scene of a western movie could be transmitted as a separate background, a separate image of a horse and rider, and a separate image of a covered wagon. Still more data pertinent to the program could be transmitted separately, such as biographical information on the actors, links to Internet information related to the program, and graphical or audible information which may be overlaid on the program. Such graphical information might include purchase price or other billing information or audible descriptions relating to the program. The present invention may be utilized with any one or combinations of ones of such separately transmitted information if an MPEG 4 type program, or with other types of separately transmitted information which may be combined to provide a received data stream.

When the invention is used with other than image transmissions, the I' frame described above (or its equivalent) is desired to simply be a useful representation of the material being transmitted, for example, in radio programming it could be a short audio clip. With MPEG 4, it might be only one of the separate images such as a foreground image (the horse and rider of the previous example). Thus the I' frame may not be a video frame at all, but some other type of representation, for example, such as an audio clip or a graphic. In systems where the program material which is used in place of the I' frame is other than the preferred motion video program image derived, it will be referred to herein a intra coded program clip or I clip. It is preferred that I clips and I' frames be intra coded, or otherwise coded in order to facilitate fast decoding at the viewer (e.g. receiver) location.

Consequently, an I clip may be or include I' frames, or may be audio segments, graphics, images, or other representatives of part or all of non motion video program information being transmitted. This invention disclosure specifically defines I clips and I' frames as actual program related information, that is taken from or representative of the actual program material or content. I' frames are preferred to correspond to frames of motion video program images and I clips are preferred to include I' frames as well as corresponding to other types of program related information. In terms of set theory, I clips include the set of I' frames which include the set of I frames.

The above descriptions and definition are intended to distinguish I clips from program guides and the like which are textual or graphical descriptions or summaries of programs, but are not directly related to actual program related information. Such program guides are commonly presented in multiple channel systems and are information about a program rather than information, such as images, taken from the program; or directly related to the information in the program such as images similar to the images of the program. It is noted that an I' frame or I clip changes as the content of a program changes, whereas program guides and the like are fixed throughout a program.

As another example, on a channel where the president is giving a speech, a frame of the program being transmitted, or a photograph of the president or other image actually derived from or closely related to the program images could be used for and considered to be an I' frame or I clip as defined herein. A program guide such as the text "president's speech" displayed on the program display device, in a newspaper, or on some other device would not be considered to be an I' frame or I clip.

Those skilled in the art will recognize that modifications and variations can be made without departing from the spirit of the invention. Therefore, it is intended that this invention encompass all such variations and modifications as fall within the scope of the appended claims.

What is claimed is:
1. A method for channel surfing compressed television signals comprising:
 providing access to a plurality of television channels from a first television signal input coupled to a first tuner;
 providing access to a non-program channel from a second television signal input coupled to a second tuner;

receiving and viewing a first compressed video stream comprising a first plurality of compressed frames for a first channel;

decoding one of the first plurality of compressed frames as a first decoded frame;

providing the first decoded frame for display;

storing a first I' frame corresponding to a motion television programming for a second channel in a memory as a first stored I' frame, wherein the first I' frame is representative of the video portion of the particular program being broadcast on said second channel at the time of said storing and does not include an intra-coded frame used in the reconstruction of a P and B frame;

updating said stored first I' frame from time to time;

wherein said first I' frame is received on a non-program channel prior to storing it in the memory;

upon receipt of a user command to change from viewing said first compressed video stream to viewing the video stream from said second channel, retrieving the first stored I' frame from the memory;

decoding the first stored I' frame; and providing the first stored I' frame for display before displaying said video stream from said second channel.

2. A method for channel surfing compressed television signals comprising:

providing access to a plurality of television channels from a first television signal input coupled to a first tuner;

providing access to a non-program channel from a second television signal input coupled to a second tuner;

receiving and viewing a first compressed video stream comprising a first plurality of compressed frames for a first channel;

decoding one of the first plurality of compressed frames as a first decoded frame;

providing the first decoded frame for display;

storing a first I' frame corresponding to a motion television programming for a second channel in a memory as a first stored I' frame, wherein the first I' frame is representative of the video portion of the particular program being broadcast on said second channel at the time of said storing and does not include an intra-coded frame used in the reconstruction of a P and B frame;

upon receipt of a user command to change from viewing said first compressed video stream to viewing the video stream from said second channel, retrieving the first stored I' frame from the memory;

decoding the first stored I' frame;

providing the first stored I' frame for display before displaying said video stream from said second channel;

storing a second I' frame in a memory for a third channel as a second stored I' frame;

retrieving the second stored I' frame from the memory;

decoding the second stored I' frame; and providing the second stored I' frame for display;

wherein said first I' frame is received on a non-program channel prior to storing it in the memory;

and wherein said second I' frame is received on the non-program channel prior to storing it in the memory.

3. A method for channel surfing compressed television signals comprising:

providing access to a plurality of television channels from a first television signal input coupled to a first tuner;

providing access to a non-program channel from a second television signal input coupled to a second tuner;

receiving a first compressed video stream comprising a first plurality of compressed frames for a first channel;

decoding one of the first plurality of compressed frames as a first decoded frame;

providing the first decoded frame for display before displaying said video stream from said second channel;

storing a first I' frame corresponding to a regularly broadcast television programming for a second channel in a memory as a first stored I' frame, wherein the first I' frame is representative of the video portion of the particular program being broadcast on said second channel at the time of said storing and does not include an intra-coded frame used in the reconstruction of a P and B frame;

upon receipt of a user command to change from viewing said first compressed video stream to viewing the video stream from said second channel, retrieving the first stored I' frame from the memory;

decoding the first stored I' frame; and providing the first stored I' frame for display before displaying said video stream from said second channel;

storing a second I' frame in a memory for a third channel as a second stored I' frame;

retrieving the second stored I' frame from the memory;

decoding the second stored I' frame;

and providing the second stored I' frame for display;

wherein said first I' frame is received on a channel that carries non-program data prior to storing it in the memory; and wherein said second I' frame is received on the non-program channel prior to storing the second I' frame in the memory.

4. A television receiver capable of channel surfing compressed television signals comprising:

a channel selector capable of being controlled by a viewer;

a first tuner coupled to and controlled by the channel selector;

a second tuner coupled to and controlled by the channel selector;

a first decoder coupled to and receiving the output of the first tuner;

a second decoder coupled to and receiving the output of the second tuner;

an I' frame memory: coupled to and receiving output of the second tuner, and coupled to and controlled by the channel selector;

a first switch: coupled to and controlled by the channel selector, and coupled to and receiving output from the first tuner and the I' frame memory; and an output: coupled to and receiving output from the first switch, and providing a television signal to a display;

wherein: a first I' frame corresponding to a motion television programming on a second channel is representative of the video portion of the particular program being broadcast on said second channel at the time of said storing, wherein the first I' frame does not include an intra-coded frame used in the reconstruction of a P and B frame, the first I' frame being received on a non-program channel by the second tuner for storage in the I' frame memory as a first stored I' frame while a television programming is being received on a first channel by the first tuner, is being decoded by the first decoder, is being selected by the first switch, and is being provided to the output for the display;

and the first I' frame is retrieved from the I' frame memory and is then provided via the first switch to the output for the display when the viewer causes the channel selector to select the second channel after the viewer has viewed the television programming on the first channel;

a first television signal input coupled to and providing access to a plurality of television channels to the first tuner;
and a second television signal input coupled to and providing access to a non-program channel to the second tuner.

5. The television receiver in claim 4 wherein:
the first switch is coupled to and provides input to the first decoder.

6. The television receiver in claim 4 wherein:
a second I' frame corresponding to a television programming on a third channel is received on a non-program channel that is a dedicated I' frame channel by the second tuner for storage in the I' frame memory as a second stored I' frame while a television programming is being received on the first channel by the first tuner, is being decoded by the first decoder, is being selected by the first switch, and is being provided to the output for the display;
and the second I' frame is retrieved from the I' frame memory and is then provided via the first switch to the output for the display when the viewer causes the channel selector to select the third channel after the viewer has viewed the first I' frame.

7. The television receiver in claim 4 which further comprises:
an audio clip memory coupled to and receiving the output from the second tuner;
a combiner: coupled to and receiving the output of the audio clip memory and the I' frame memory, coupled to and providing an input to the first switch, and coupled to and controlled by the channel selector;
and wherein at least some of the I' frames sent by the non-program channel contain
audio clip information.

8. The television receiver in claim 4 which further comprises:
a program memory: coupled to and controlled by the channel selector, coupled to and receiving output from the first tuner and the second tuner, and coupled to and providing an input to the first switch.

9. The television receiver in claim 8 which further comprises:
a second switch: coupled to and receiving output from the first tuner and the second tuner, coupled to and providing input to the program memory, and coupled to and controlled by the channel selector.

10. The television receiver in claim 4 which further comprises:
a bus coupling the first tuner, the second tuner, the first decoder, the second decoder, the channel selector, and the I' frame memory.

11. An apparatus for providing for channel surfing compressed television signals comprising:
a means for transmitting a first television programming comprising a first plurality of compressed images on a first channel;
and a means for transmitting an I' frame on a non-programming channel corresponding to a second motion television programming comprising a second plurality of compressed images on a second channel, wherein the I' frame does not include an intra-coded frame used in the reconstruction of a P and B frame and wherein the I' frame is representative of a video portion of the particular program being broadcast on said second channel at a time when the first I' frame is stored and a first television signal input coupled to and providing access to a plurality of television channels to a first tuner; and
a second television signal input coupled to and providing access to a non-program channel to a second tuner.

12. A method for providing for channel surfing compressed television signals comprising:
providing access to a plurality of television channels from a first television signal input coupled to a first tuner;
providing access to a non-program channel from a second television signal input coupled to a second tuner;
transmitting a first television programming comprising a first plurality of compressed images on a first channel;
and transmitting a first I' frame on a dedicated I' frame channel corresponding to a second regularly broadcast television programming comprising a second plurality of compressed images on a second channel, wherein the first I' frame does not include an intra-coded frame used in the reconstruction of a P and B frame and wherein the I' frame is representative of a video portion of the particular program being broadcast on said second channel at a time when the first I' frame is stored.

13. The method in claim 12 which further comprises:
transmitting the second television programming on the second channel.

14. The method in claim 12 which further comprises:
transmitting a second I' frame on the dedicated I' frame channel corresponding to a third television programming comprising a third plurality of compressed images on a third channel.

15. The method in claim 12 which further comprises:
converting an I frame from the second plurality of compressed images to be the first I' frame by reducing resolution of the I frame.

16. The method in claim 12 which further comprises:
providing a static image as the first I' frame.

17. The method in claim 12 which further comprises:
transmitting an audio clip along with the first I' frame to identify the second television programming.

18. A method for providing for channel surfing compressed television signals in a multi-channel digital television system comprising:
providing access to a plurality of television channels from a first television signal input coupled to a first tuner;
providing access to a non-program channel from a second television signal input coupled to a second tuner;
transmitting a plurality of digital television programming channels, wherein each regularly broadcast television programming channel consists of a plurality of compressed images, each containing at least some I frame images;
and transmitting at least one dedicated I' frame channel consisting of I' frames derived from either the I frame data or the audio data from said plurality of digital television programming channels, wherein the one dedicated I' frame does not include an intra-coded frame used in the reconstruction of a P and B frame and wherein the I' frame is representative of a video portion of the particular program being broadcast on one channel at a time when the first I' frame is stored.

19. The method of claim 18, wherein said dedicated I' frame channel is not a regular digital television programming channel.

20. The method of claim 18, wherein the digital television system sends signals using a transmission medium selected from the group consisting of radio waves through the air, cable, television lines, digital cable television lines, fiber, the Internet, satellite or any other similar or equivalent medium of transmission programming, and the I' frame is a low resolution I frame transmitted by the transmission medium.

21. The method of claim 18, further consisting of receiving at least one of said plurality of digital television channels, and also receiving said dedicated I' frame channel;
   Anticipating which of said plurality of digital television channels is likely to be selected next (anticipated channel);
   Retrieving said I' frame for said anticipated channel from said dedicated I' frame channel;
   Momentarily displaying the retrieved I' frame when said anticipated channel is selected.

22. The method of claim 21, wherein said retrieved I' frame for said anticipated channel is received prior to the reception of an I frame from said anticipated channel.

23. The method of claim 21, in which said retrieved I' frame is fully decoded and stored in I' frame memory, and directly displayed when desired without waiting for further decoding.

24. The method of claim 21, in which the anticipated channel is chosen based on the past surfing or current surfing or viewing habits of one or more viewers, on the identity of the viewer that is watching at the present time, or on the stored viewing habits for one or more viewers.

25. The method of claim 21, in which the dedicated I' frame channel is received on either a separate tuner that is distinct from a main tuner used to receive a viewed channel, or by briefly switching a single main tuner from a viewed channel to a dedicated I' frame channel, and then back to the viewed channel again.

26. The method of claim 21, in which at least some of the retrieved I' frames received on said dedicated I' frame channel are supplemented by additional I' frames retrieved from a second tuner that is receiving a channel that is neither a channel presently being viewed nor a dedicated I' frame channel.

27. A television receiver capable of channel surfing compressed television signals comprising:
   a channel selector capable of being controlled by a viewer;
   at least one main tuner coupled to and controlled by the channel selector;
   at least one additional tuner capable of I' frame acquisition, wherein the acquired I' frame does not include an intra-coded frame used in the reconstruction of a P and B frame and wherein an I' frame is representative of a video portion of the particular program being broadcast on one channel at a time when the first I' frame is stored;
   wherein said at least one additional tuner capable of I' frame acquisition acquires I' frames from a plurality of regularly broadcast channels while the main tuner displays a channel being viewed by the viewer, and said at least one additional tuner capable of I' frame acquisition receives I' frames and transfers said I' frames in a compressed form into I' frame memory for storage;
   wherein upon receiving a channel change request from said channel selector, said receiver inspects said I' frame memory for the new channel and if found displays said I' frame for at least a portion of the time while one of the tuners switches to the new channel:,
   a first television signal input coupled to and providing access to a plurality of television channels to a first tuner; and
   a second television signal input coupled to and providing access to a non-program channel to a second tuner.

28. The television receiver of claim 27, in which the at least one additional tuner capable of I' frame acquisition is coupled to electrical circuits that are fully capable of decoding all the elements of the compressed television signal channels.

29. The television receiver of claim 27, in which the at least one additional tuner capable of I' frame acquisition is specialized to receiving the I' frame components of the compressed television signal channels.

30. The television receiver of claim 27, in which the at least one additional tuners capable of I' frame acquisition scan through a plurality of television channels and acquire I' frame data using a scanning protocol that incorporates data selected from the group consisting of the user's channel viewing history, the program subject of the channel being viewed, channels surrounding the channel presently being viewed, and how quickly successive I' frames from a given channel change with time.

31. The television receiver of claim 27, in which there are at least two additional tuners capable of I' frame acquisition, and these tuners scan through a plurality of television channels and acquire I' frame data using a scanning protocol that incorporates data selected from the group consisting of the user's channel viewing history, the program subject of the channel being viewed, channels surrounding the channel presently being viewed, and how quickly successive I' frames from a given channel change with time.

32. A method for channel surfing compressed television signals comprising:
   providing access to a plurality of television channels from a first television signal input coupled to a first tuner;
   providing access to a non-program channel from a second television signal input coupled to a second tuner;
   receiving a first compressed video stream comprising a first plurality of compressed frames for a first channel;
   decoding one of the first plurality of compressed frames as a first decoded frame;
   providing the first decoded frame for display;
   storing a first I' frame corresponding to a motion television programming for a second channel in a memory as a first stored I' frame, wherein the first I' frame does not include an intra-coded frame used in the reconstruction of a P and B frame and wherein the I' frame is representative of a video portion of the particular program being broadcast on said second channel at a time when the first I' frame is stored;
   wherein said first I' frame is received on a channel that carries non-program data prior to storing it in the memory;
   retrieving the first stored I' frame from the memory;
   decoding the first stored I' frame; and providing the first stored I' frame for display.

* * * * *